United States Patent [19]
Miyake et al.

[11] Patent Number: 5,185,976
[45] Date of Patent: Feb. 16, 1993

[54] FLOOR VIBRATION-DAMPING APPARATUS

[75] Inventors: Hiraku Miyake; Mitsuo Ishiguro; Shigetaka Abe; Nobuo Yamaguchi; Yutaka Hayamizu; Satoru Aizawa, all of Tokyo, Japan

[73] Assignee: Takenaka Corporation, Japan

[21] Appl. No.: 729,908

[22] Filed: Jul. 15, 1991

Related U.S. Application Data

[63] Continuation of Ser. No. 283,808, Dec. 19, 1988, abandoned.

[30] Foreign Application Priority Data

Jan. 6, 1988 [JP] Japan ......................... 63-822
Sep. 14, 1988 [JP] Japan ..................... 63-231287
Sep. 19, 1988 [JP] Japan ..................... 63-234642

[51] Int. Cl.[5] ............................................. E04B 1/98
[52] U.S. Cl. ........................... 52/167 RA; 52/167 EA
[58] Field of Search .................. 52/167 RA, 167 EA; 248/636, 638

[56] References Cited

U.S. PATENT DOCUMENTS

| | | | |
|---|---|---|---|
| 2,055,000 | 9/1936 | Bacigalupo | 52/167 |
| 3,977,140 | 8/1976 | Matsudaira et al. | 52/167 |
| 4,353,189 | 10/1982 | Thiersch et al. | 52/167 |
| 4,517,778 | 5/1985 | Nicolai | 52/167 |
| 4,617,769 | 10/1986 | Fyfe et al. | 51/167 |
| 4,805,359 | 2/1989 | Miyake et al. | 52/167 |

*Primary Examiner*—Michael Safavi
*Attorney, Agent, or Firm*—Ronald P. Kananen

[57] ABSTRACT

A floor vibration-damping apparatus damps a horizontal vibration of a floor based on an earthquake or the like. This apparatus comprises a movable supporting portion for supporting a floor structure with being free to move horizontally, and a damper working portion provided between said floor structure and a fixed floor.

15 Claims, 12 Drawing Sheets

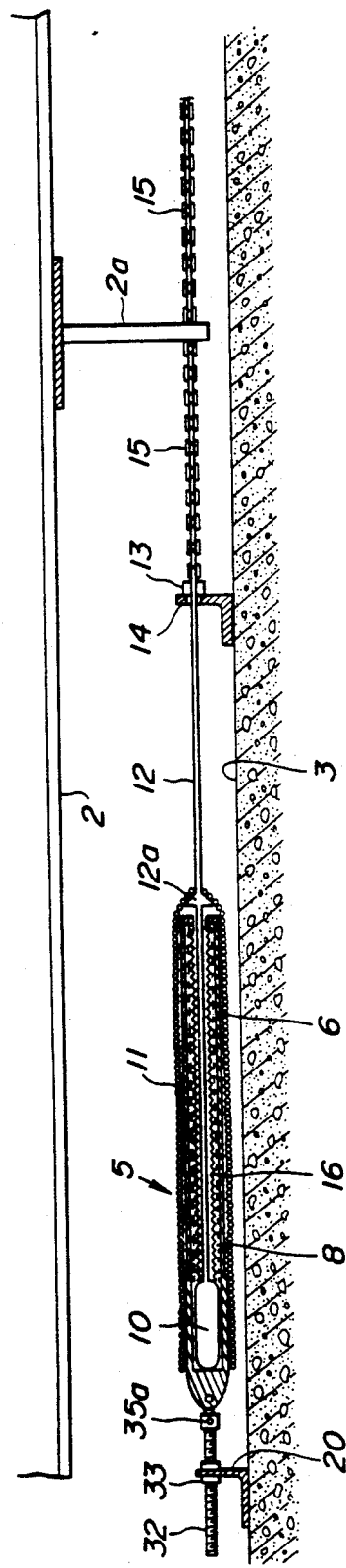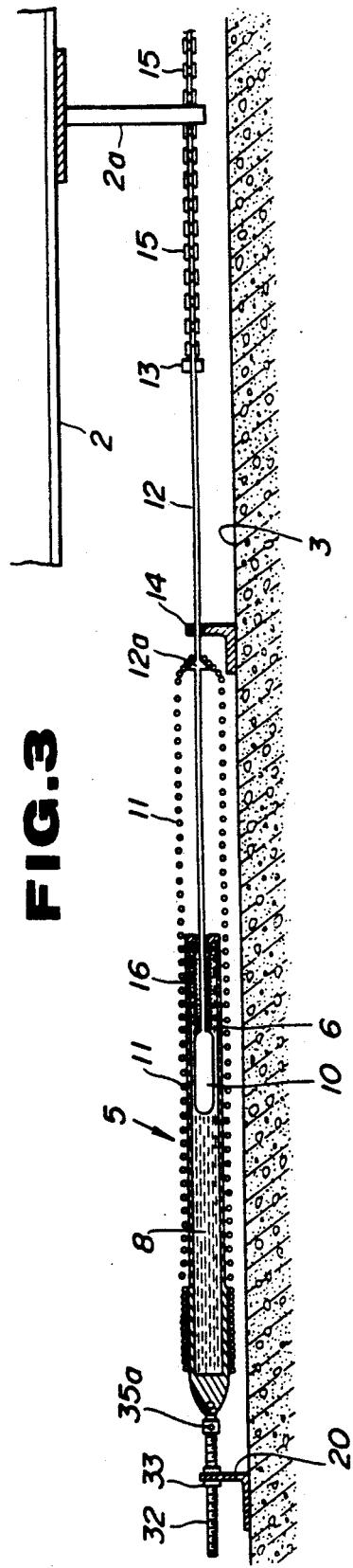

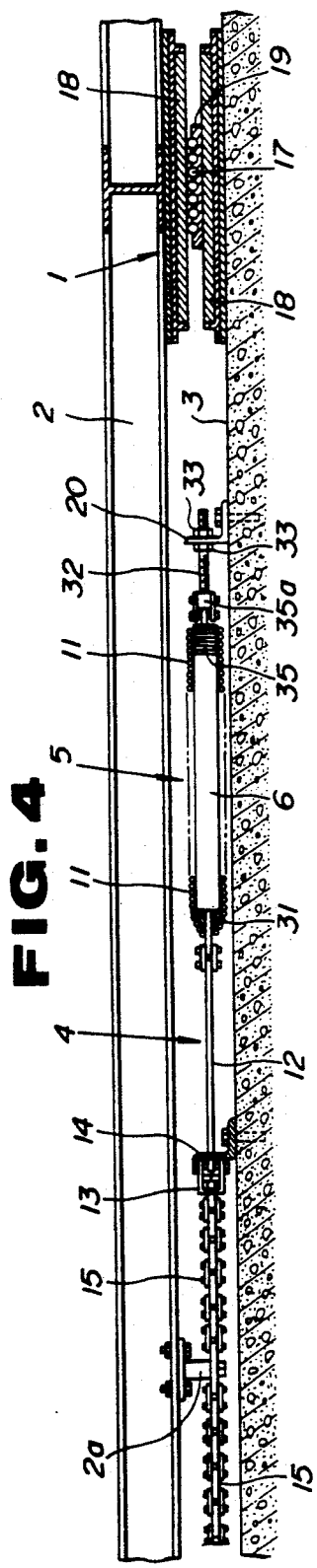
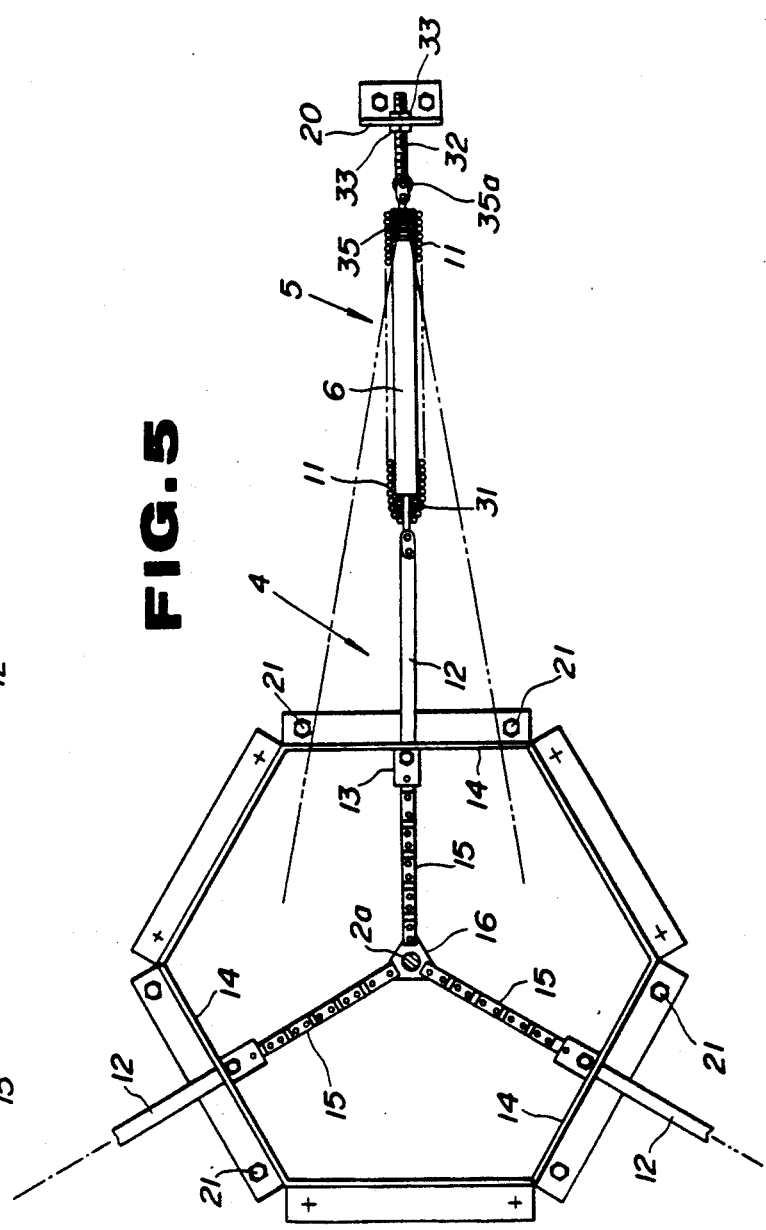

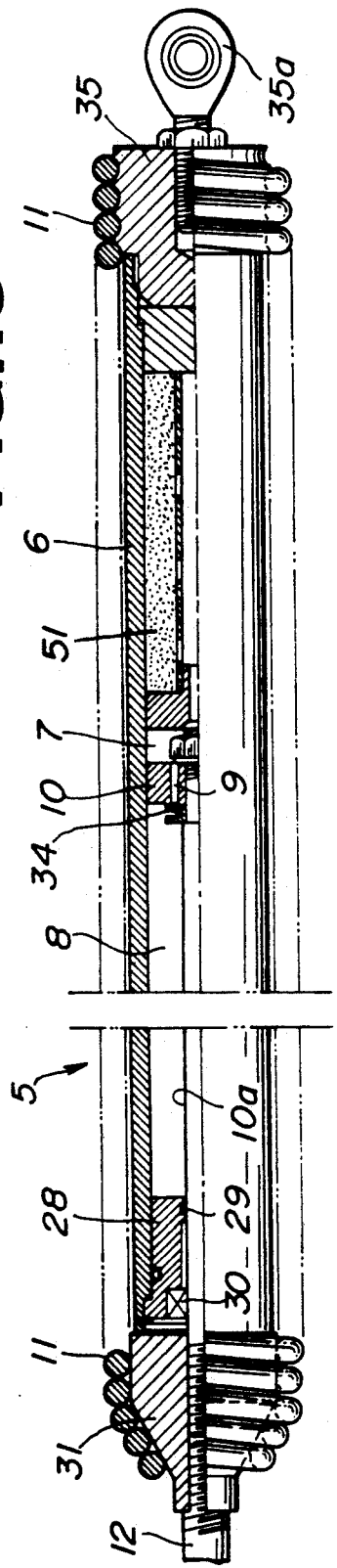
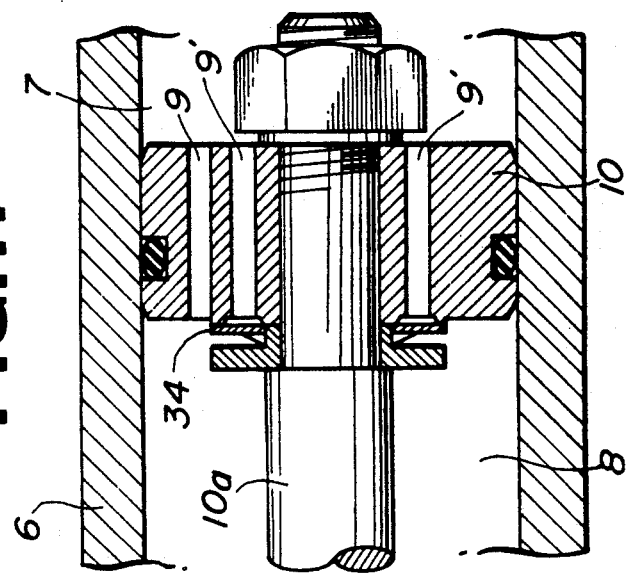

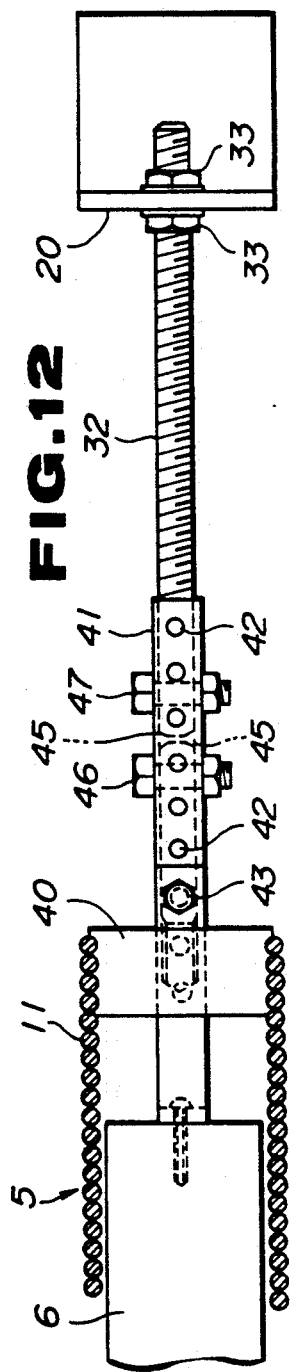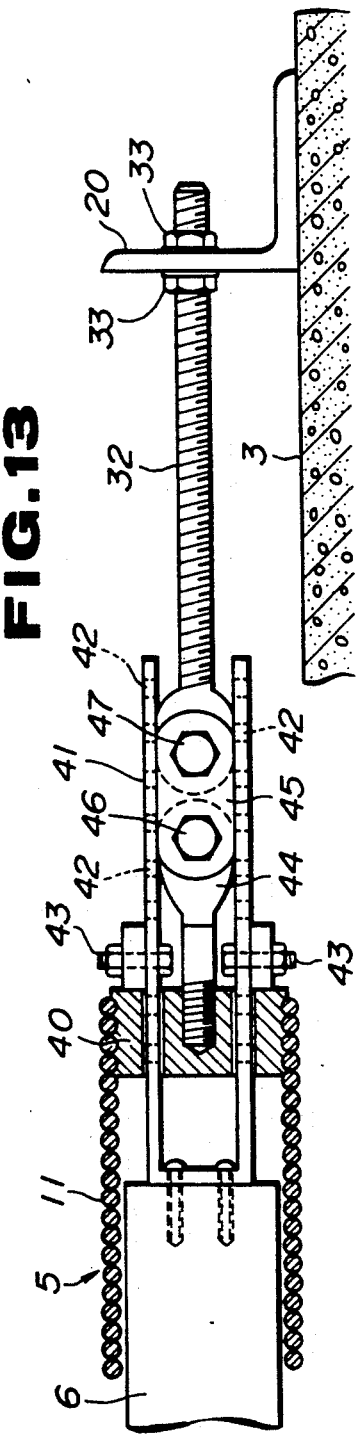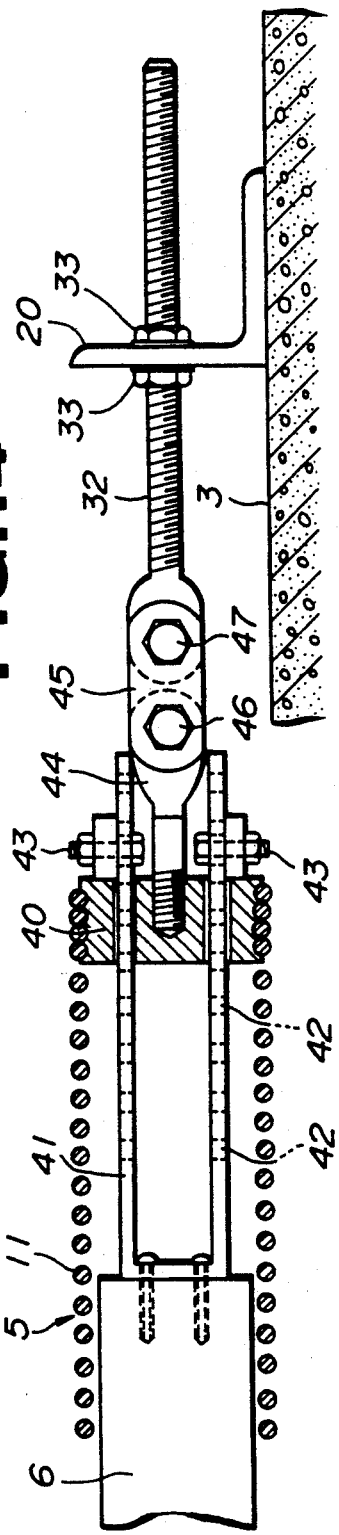

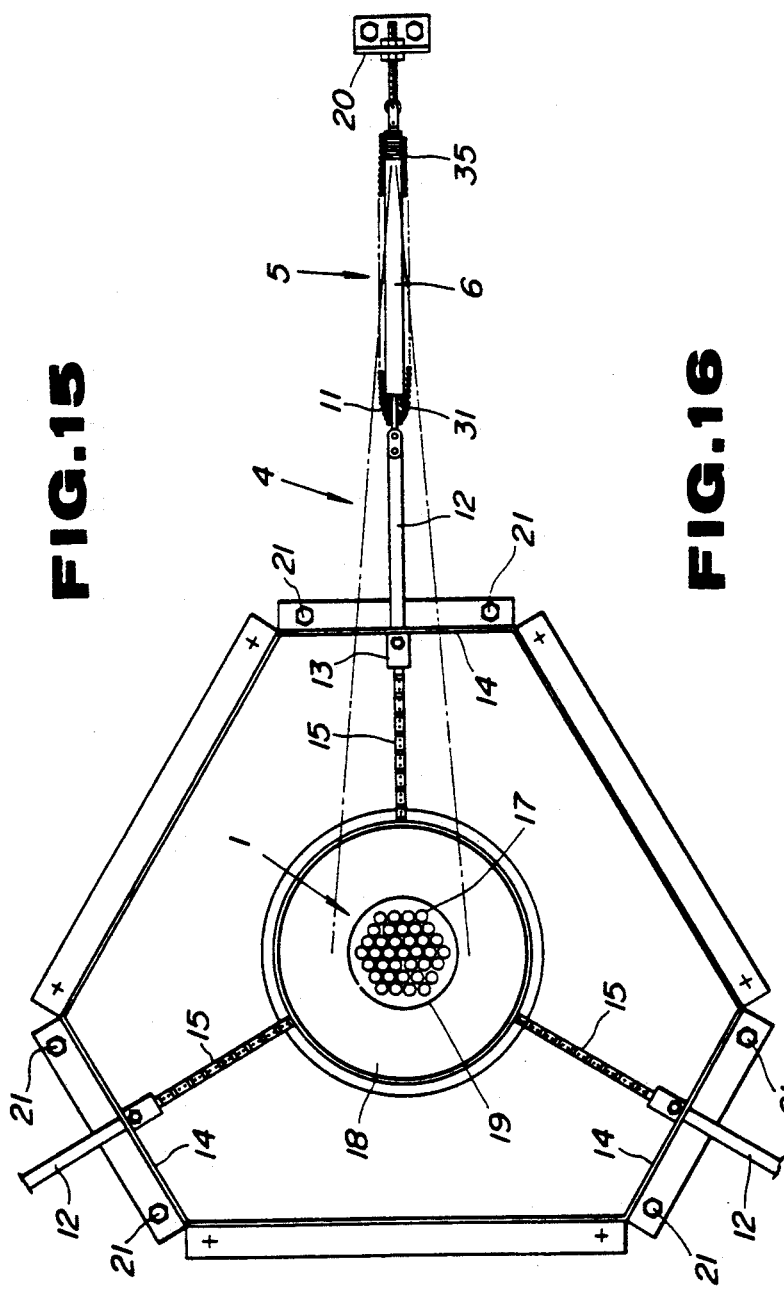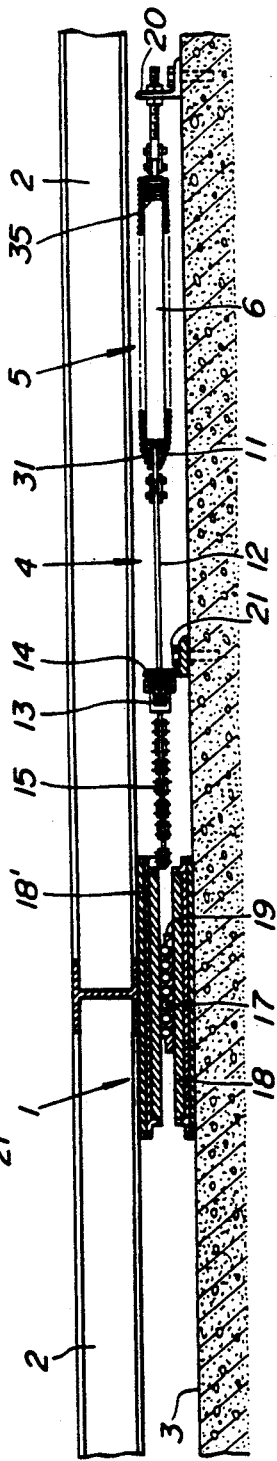

FLOOR VIBRATION-DAMPING APPARATUS

This application is a continuation of application Ser. No. 07/283,808 filed Dec. 13, 1988, now abandoned.

BACKGROUND OF THE INVENTION

The present invention relates to a floor vibration-damping apparatus for damping a horizontal vibration of a floor, based on an earthquake, on which vibration sensitive office automation equipment, such as computers, is provided.

For example, Japanese Published Unexamined Patent Application No. 62-86265 (corresponding to U.S. Pat. No. 4,805,359 issued on Feb. 21, 1989, discloses a floor vibration-damping apparatus whose main portion is illustrated in FIG. 18. A movable supporting portion B having steel balls b supports a flat floor construction F which is made of H-shaped steel and can move horizontally with a low resistance. Damper working portions A are provided between the floor structure F and a fixed floor C.

FIG. 19 shows a construction of the damper working portion A in detail. A shallow and flat circular vessel a1 is fixed to the fixed floor C, and accommodates a viscous fluid a2. A horizontal resistance plate a3 is submerged in the viscous fluid a2 in parallel with the bottom surface of the vessel a1, and a distance therebetween is a constant d. This resistance plate a3 is fixed to the floor structure F by a rod a4.

Tension coil springs E are provided in four directions at right angles with respect to one another in a neutral position of the resistance plate a3. The outer end of each coil spring E is fixed to the fixed floor C by a fixing device e, and the inner end thereof is coupled with the rod a4 as a resistance input portion of the floor structure F through a hard rod G and a flexible chain g. The hard rod G reaches a surrounding wall of the circular vessel a1 which acts as a reaction base, and an end portion of the rod G is fixed to a stopper H which touches the inner surface of the side wall of the vessel a1. A chain g is connected between a position at the stopper H and the rod a4.

Pretension of a predetermined value is previously applied to the coil spring E of each direction for a trigger function. The trigger value is set so that the stopper H applies the reaction to the surrounding wall of the vessel a1 and no load is applied to the rod a4 at the neutral position. In a case that the floor structure F receives the horizontal input based on the earthquake or the like, if the horizontal input is lower than the trigger setting value of the coil springs E, the horizontal movement of the floor structure F is restricted perfectly and the floor structure F does not move.

However, if the floor structure F moves horizontally by receiving the horizontal input larger than the trigger setting value, the resistance input plate a3 moves simultaneously and the coil spring E in the pulling direction position is extended. At this time, the viscous resistance received by the resistance input plate a3 acts as an attenuation force and prevents an excessive displacement of the floor structure F. The tension force of the coil springs E applies the recovery force to return the floor structure to the original position.

In the floor vibration-damping apparatus disclosed in the above Japanese Published Unexamined Patent Application No. 62-86265, a cover is slidably put on the upper opening of the vessel a1 which accommodates the viscous fluid a2. However, the opening is not perfectly sealed by the cover so as to allow the resistance plate a3 and the rod a4 supporting it to move. Thus, it is troublesome to carry the damper working portion A from a factory to a building site to set and manage it. In addition, alien substances, such as dust may mix with the viscous fluid a2 during and after the installation of the vibration-damping floor. If so, characteristics of the viscous fluid a2 may change, and especially the coefficient of viscosity may change, so that the damper characteristic may change. The viscous fluid a2 may be added to the damper working portion A. In this instance, maintenance may be necessary.

It is well known that the viscous resistance applied to the resistance plate a3 in the viscous fluid a2 is inversely proportional to the distance d between the plate a3 and the bottom surface of the vessel a1. In order to set and maintain precisely the distance d, the horizontal accuracy of the resistance plate a3 and the vessel's bottom surface are important. For this end, high accuracy is required during installation. In addition, the distance d may be expected to change in accordance with the installation error of the vibration-damping floor, the load against the floor for the usage period and the secular change. However, it may be impossible to adjust the distance d during the usage period, and it may be very difficult to maintain the damper characteristics. In order to set the resistance plate a3, the damper working portion A needs many components to mount a mounting plate a5 at the floor structure F, thereby increasing the cost of the floor vibration-damping apparatus.

In the floor vibration-damping apparatus disclosed in the above Japanese Published Unexamined Patent Application No. 62-86265, the floor structure F consists of the movable supporting portion B and the damper working portion A independently. This construction is shown in FIG. 20 which is a plan view of the floor structure F, wherein the movable supporting portions B are positioned at apices of squares having about 2 m sides and each of the damper working portions A is positioned at the center of each square. In other words, they are positioned in due consideration of the supporting of the floor structure F and the force balance of the earthquake. Thus, there is a complex construction under the floor of the floor structure F, and it is difficult to design and install the floor vibration-damping apparatus with maintaining accurate spacing.

SUMMARY OF THE INVENTION

A floor vibration-damping apparatus according to this invention is constructed for resolving the above discussed problems as shown in preferred embodiments in the attached drawings.

According to a first aspect of the invention, the floor vibration-damping apparatus comprises a movable supporting portion for supporting a floor structure which is free to move horizontally, and a damper working portion provided between the floor structure and a fixed floor, and it is characterized as follows:

a) In the damper working portion, spring damper mechanisms are arranged radially with respect to a resistance input portion of the floor structure, and damper rods of the spring damper mechanisms are connected to the resistance input portion. Cylinder portions are coupled with the fixed floor.

b) In the fixed floor, reaction bases are fixed at positions apart from a neutral position of the resistance input portion by a predetermined movement distance.

c) In the spring damper mechanism, a tension coil spring is wound on to the external surrounding of the piston cylinder type damper, one end of the spring is fixed to one end of the cylinder and the other end thereof is fixed to the damper rod so that both the cylinder and the spring are composed concentrically. A stopper is provided, at an inner position of the reaction base, to the damper rod which extends from the spring damper mechanism to the resistance input portion of the floor structure, and a flexible member, such as a chain, is connected between the stopper position and the resistance input portion.

The floor vibration-damping apparatus shown in FIGS. 1 through 5 satisfies these characteristics.

According to a second aspect of the invention, the floor vibration-damping apparatus comprises a movable supporting portion for supporting a floor structure which is free to move horizontally, and a damper working portion provided between the floor structure and a fixed floor, and it is characterized as follows:

a) In the damper working portion, spring damper mechanisms are arranged radially with respect to a movable supporting portion of the floor structure, and damper rods of the spring damper mechanisms are connected to a side portion of the movable supporting portion. Cylinder portions are coupled with the fixed floor.

b) In the fixed floor, reaction bases are fixed at positions being apart from a neutral position of the movable supporting portion by a predetermined movement distance.

c) In the spring damper mechanism, a tension coil spring is wound on to the external surrounding of the piston cylinder type damper, one end of the spring is fixed to the cylinder and the other end thereof is fixed to the damper rod so that both the cylinder and the spring are composed concentrically. A stopper is provided, at an inner position of the reaction base, to the damper rod which extends from the spring damper mechanism to the movable supporting portion of the floor structure, and a flexible member, such as a chain, is connected between the stopper position and the movable supporting portion.

The floor vibration-damping apparatus shown in FIGS. 15 and 16 satisfies these characteristics wherein the movable supporting portion and the damper working portion are combined.

In the above two aspects of the invention, the spring damper mechanisms are arranged radially in three directions (FIG. 5) or in four orthogonal directions (FIG. 1) with respect to the resistance input of the floor structure or the movable supporting portion.

Moreover, the spring damper mechanism is constructed by composing concentrically the piston cylinder type damper and the tension spring wound on to the external surrounding of the damper. The damper includes a piston having an orifice coupling a front chamber and a back chamber in the cylinder accommodating the viscous fluid (FIG. 10).

In addition, a reverse protection valve is provided at a back surface of the piston of the piston cylinder type damper so that the valve opens an opening of the orifice by operation fluid flowing from the front chamber to the back chamber when the piston moves forward.

Objects and advantages of the present invention will become apparent to those having ordinary skill in the art when taken in conjunction with the accompanying drawings.

DRAWINGS

FIGS. 2 and 3 are cross sectional views for explaining neutral and tension conditions of a spring damper mechanism;

FIG. 4 is an elevation view of an entire construction of a second embodiment of the floor vibration-damping apparatus according to this invention;

FIG. 5 is a plan view of the damper working portion;

FIG. 10 shows the spring damper mechanism in detail;

FIG. 11 is a magnified view of a piston portion of the spring damper mechanism;

FIGS. 12 through 14 are plan and front views of different examples of the spring damper mechanism to which a pretension is applied;

FIG. 15 is a plan view of an entire construction of a third embodiment of the floor vibration-damping apparatus according to this invention;

FIG. 16 is an elevation view of the third embodiment in FIG. 15;

DETAILED DESCRIPTION OF THE INVENTION

Figure 1:
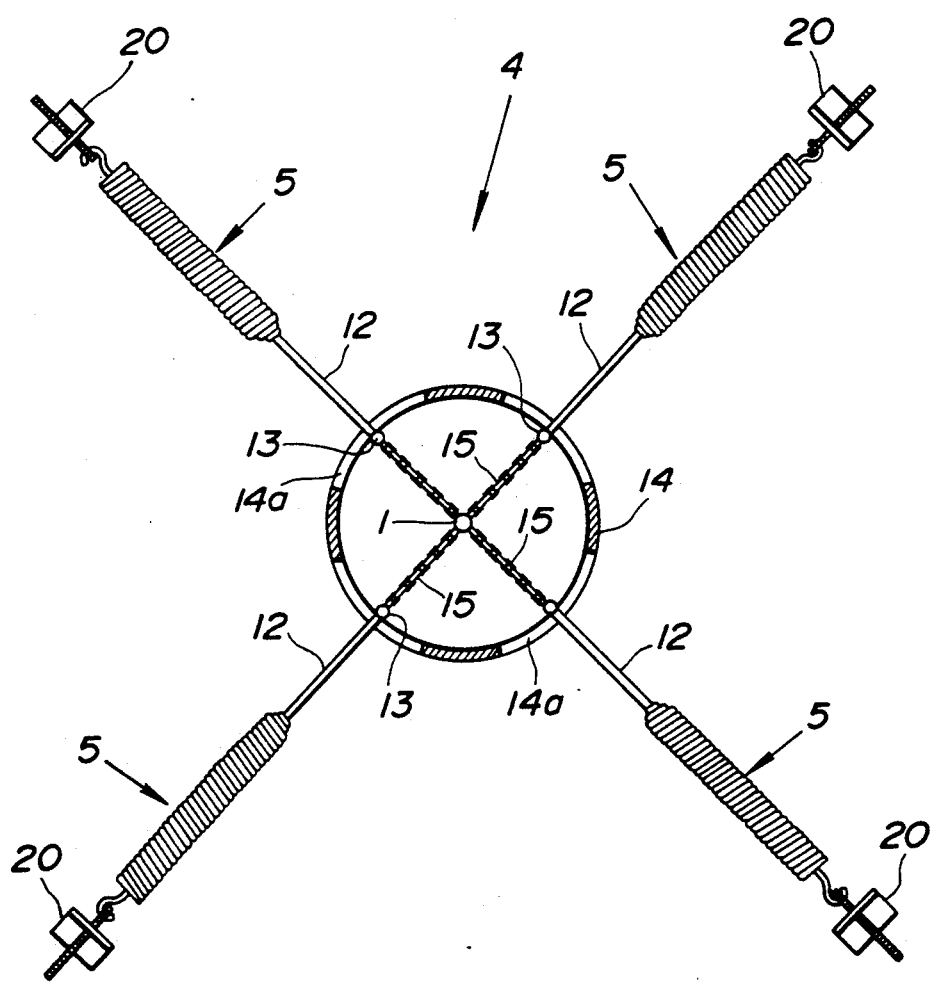
FIG. 1 is a plan view of an entire construction of a damper working portion of a floor vibration-damping apparatus according to this invention.

Referring to FIGS. 1 through 17, a predetermined pretension (trigger setting value) can be previously applied to a tension coil spring 11 of a spring damper mechanism 5 for a trigger function. This pretension applies a reaction to a reaction base 14 via a stopper 13, so that a resistance input portion, such as a rod 2a, of a floor structure at a neutral position is not affected by a load. Thus, if a fixed floor 3 vibrates by an earthquake or the like, a floor structure 2 maintains a standing condition unless receiving a horizontal force larger than a standing inertia of the floor structure 2 and office automation equipment positioned on it, the floor structure being held by a movable supporting portion 1 and being free to move horizontally. A vibration of a fixed floor 3 with respect to a standing resistance input portion is absorbed by a flexible change of a flexible member 15.

When the floor structure 2 vibrates by receiving the horizontal force larger than the standing inertia of the floor structure, the flexible member 15 limits the vibration of the floor structure 2 so as to damp the vibration if the movement inertia is less than the trigger setting value, wherein the vibration direction of the floor structure is opposite to that of the flexible member. However, when the floor structure 2 receives the larger horizontal input and the movement inertia thereof is larger than the trigger setting value, the floor structure 2 causes the spring damper mechanism 5 at the tension side to extend but the spring damper mechanism 5 at the contraction side is not affected by a change of the flexible member 15. By extending the spring damper mechanism 5 at the tension side, the vibration period of the mechanism may be long. The tension spring 11 resists and a change larger than an attenuation of the damper is prevented, so that the vibration-damping effect may be accomplished.

The movement inertia of the floor structure 2 balances with the resistance of the spring damper mechanism 5 and when the tension of the spring damper mechanism 5 becomes large, a recovery operation of the floor structure 2 starts. This recovery force depends only on the tension of the spring 11.

FIGS. 2, 3 and 10 show a piston cylinder type damper in which operation fluid is sealed in a cylinder 6 perfectly, so that there is no possibility that an alien substance mixes with the fluid and its characteristic changes, and it is convenient to carry, maintain and set the damper.

When the floor structure 2 recovers to the neutral position of the resistance input portion 2a, the stopper 13 may touch the reaction base 14 and the recovery effect of the spring damper mechanism 5 is erased with respect to the resistance input portion 2a.

Even when the floor structure 2 begins to overrun the neutral position of the resistance input portion 2a by the movement inertia, the overrunning is limited and the floor structure 2 is stopped if the movement inertia is less than the trigger setting value. If the movement inertia is larger than the trigger setting value and the floor structure 2 overruns, the spring damper mechanism 5 at the opposite side to the overrunning side operates (i.e., a contraction side in the former case) as discussed hereinbefore to accomplish the vibration-damping effect.

In the floor vibration-damping apparatus of the second aspect shown in FIGS. 15 and 16, after the position of the movable supporting portion 1 is determined with respect to the floor structure 2, a determination is made in which the movable supporting portion 1 is combined with the damper working portion 4 and the apparatus is installed. The advantages of the second aspect of the invention are the same as those of the first aspect of the invention.

In the expansion operation of the spring damper mechanism 5 constructed by combining the tension coil spring 11 and the piston cylinder type damper, the tension spring 11 is expanded and the piston 10 of the damper moves, so that a constant attenuation force may occur regardless of the length of the piston stroke because of the viscous resistance between the piston 10 and the inner wall of the cylinder for the spring damper mechanism of FIGS. 2 and 3 and because of the throttle effect of the orifice 9 for the damper of FIG. 10.

In the spring damper mechanism 5 shown in FIGS. 10 and 11, since the piston 10 moves forward when the floor structure 2 recovers, the reverse protection valve 34 is opened by the flowing pressure of the operation fluid and the opening of the orifice 9 at this position. Thus, the total flowing area of the orifice 9 increases and thereby decreases the throttle. Therefore, the resistance is small when the piston 10 moves forward, the floor structure 2 recovers smoothly, and a buckling does not occur in the piston rod 10a. When the stopper 13 touches the reaction base 14, all the operations stop.

The embodiments of the present invention will be further discussed in detail.

FIGS. 1 through 3 show the first embodiment of the present invention, and especially FIG. 1 shows an entire construction of the damper working portion 4. The four spring damper structures 5 are arranged radially in four orthogonal directions with respect to the rod 2a as the resistance input portion of the floor structure 2. (The number and direction of the spring damper structures are not limited in the invention.) In this embodiment, the movable supporting portion for supporting the floor structure 2 which is free to move horizontally is not shown. The outer end of each spring damper mechanism 5 is fixed to the fixed floor 3 by an anchor bracket 20, and a hard damper rod 12 is coupled with the rod 2a through the flexible chain 15, wherein the damper rod 12 extends from the inner end of the spring damper mechanism 5 to the chain 15.

The reaction bases 14 are fixed along a circle on the fixed floor 3, and a radius of the circle is slightly larger than the maximum movement distance (the maximum amplitude) of the vibration when the rod 2a or the floor structure 2 receives the horizontal input by the earthquake or the like, wherein the center of the circle is the neutral position of the rod 2a of the floor structure 2. The damper rod 12 extends toward the rod 2a through a slit 14a formed along the circumference of the circle of the reaction base 14. The end of the damper rod 12 is mounted at a pin or a roller shaped stopper 13 which touches the inner surface of the reaction base 14. The flexible chain 15 (or wire, rope which does not stretch) is provided between the stopper 13 and the rod 2a and is coupled with the rod 2a.

Figure 18:
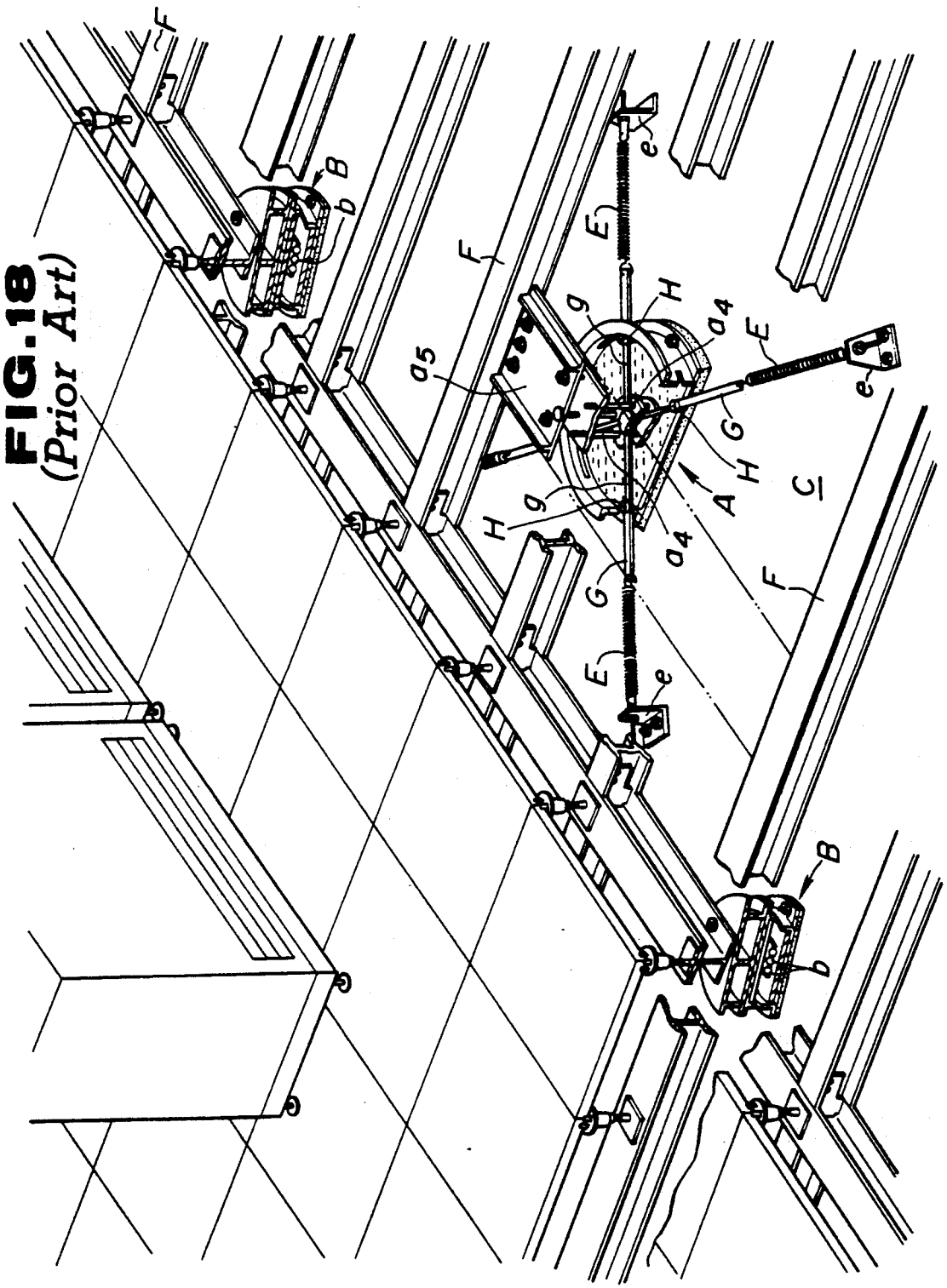
FIG. 18 is a perspective view of an entire construction of a conventional floor vibration-damping apparatus.
Figure 19:
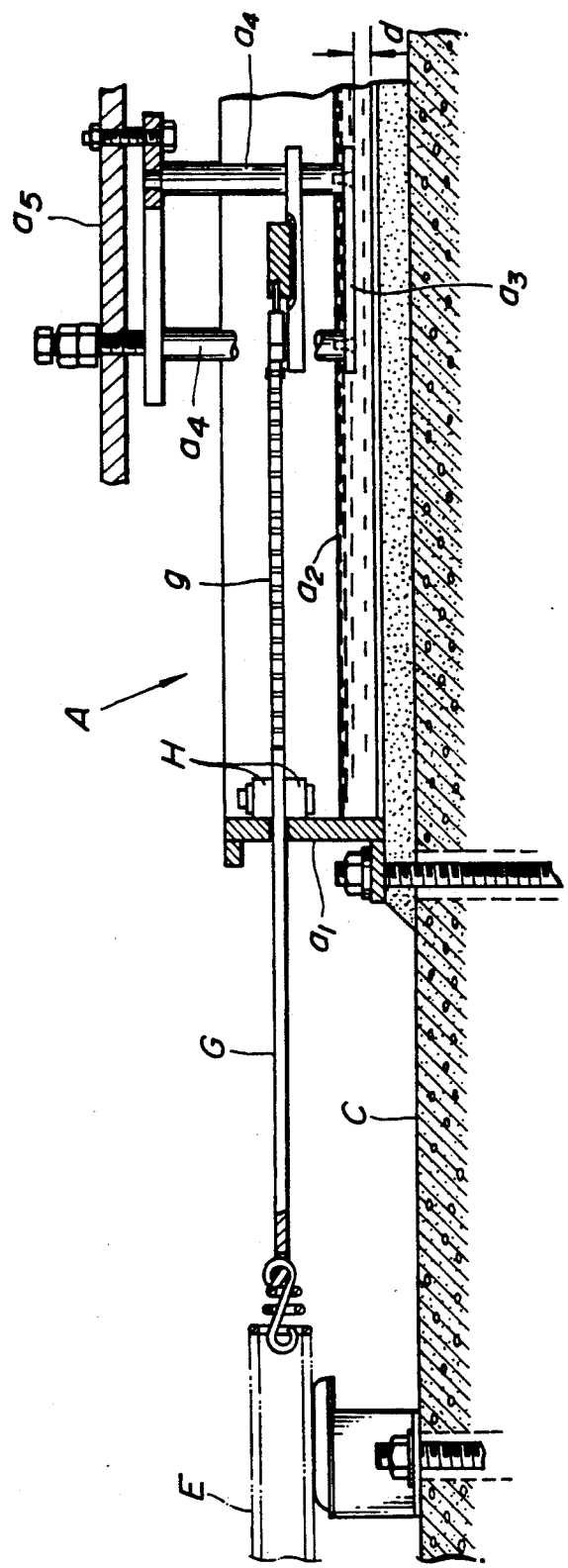
FIG. 19 is an elevation view of a main construction of a conventional damper working portion.

As shown in FIGS. 2 and 3 in detail, the downward rod 2a is projected from the lower surface of the floor structure 2 constructed by assembling the flat plate from H shaped steel (see FIG. 18), and the chain 15 is coupled with the rod 2a.

The spring damper mechanism 5 is constructed by combining the cylinder 6 and the tension spring 11 wound on to the outer surface of the cylinder 6 which accommodates the viscous fluid 8, such as silicon oil. The left end of the coil spring 11 is fixed to the left end of the cylinder 6 by winding the spring on to the cylinder, and the right end thereof is fixed to a convex portion 12a of the damper rod 12. The damper rod 12 is coupled with a submarine type piston 10 in the cylinder 6. A screw 32 is coupled with the left end of the cylinder 6 by a pin 35a, the screw 32 passing through the anchor bracket 20 and being fixed by an adjusting nut 33.

When the damper rod 12 is pulled to the right as shown in FIG. 3, the piston 10 moves in the cylinder 6 to the right and the coil spring 11 fixed at the convex portion 12a is expanded. Thus, the damper rod 12 receives the attenuation force which is a combination of the well known viscous resistance and the tension resistance of the coil spring 11 and contributes to protect the excessive change, wherein the viscous resistance is applied to the piston 10 from the full viscous fluid between the inner wall of the cylinder 6 and the piston 10.

When the recovery operation is done from the forward movement position of FIG. 3 to the neutral position of FIG. 2 by the tension of the coil spring 11, the viscous resistance of the viscous fluid 8 acts on the piston 10. Thus, the recover operation may be slow and the vibration period may be long.

Seal bellows 16 are provided between the piston 10 and the right end of the cylinder 6 and cover the outer surface of the damper rod 12 so as to seal the viscous fluid 8. Thus, it is easy to seal the shaft with the oil between the damper rod 12 and the cylinder 6.

The second embodiment of the present invention will be described hereinafter. In the floor vibration-damping apparatus shown in FIGS. 4 and 5, the floor structure 2 is supported by the movable supporting portion 1 using balls 17 by which the floor structure 2 is free to move horizontally. As shown in FIG. 5 which is a plan view, the damper working portion 4 is constructed by arranging the three spring damper mechanisms 5 in three radial directions at 120 degree angles relative to one another with the vertices of the angles at the rod 2a as the resistance input portion of the floor structure 2.

The movable supporting portion 1 is constructed by providing horizontally steel flat plates 18 and 18' on the fixed floor 3 and the floor structure 2 respectively in parallel, and inserting many (steel) balls 17, held by a supporter 19, between these two upper and lower steel flat plates 18 and 18'. Since the balls 17 rotate, the floor 2 can move (vibrate) horizontally with a low resistance. The damper working portion 4 is provided between the floor structure 2 supported by the movable supporting portion 1 and the fixed floor.

Each spring damper mechanism 5 comprising the damper working portion 4 includes an outer end coupled with the anchor bracket 20 on the fixed floor 3. The hard damper rod 12 extending from the inner end of the spring damper mechanism 5 to the rod 2a is coupled with the rod 2a via the flexible chain 15.

Figure 7:
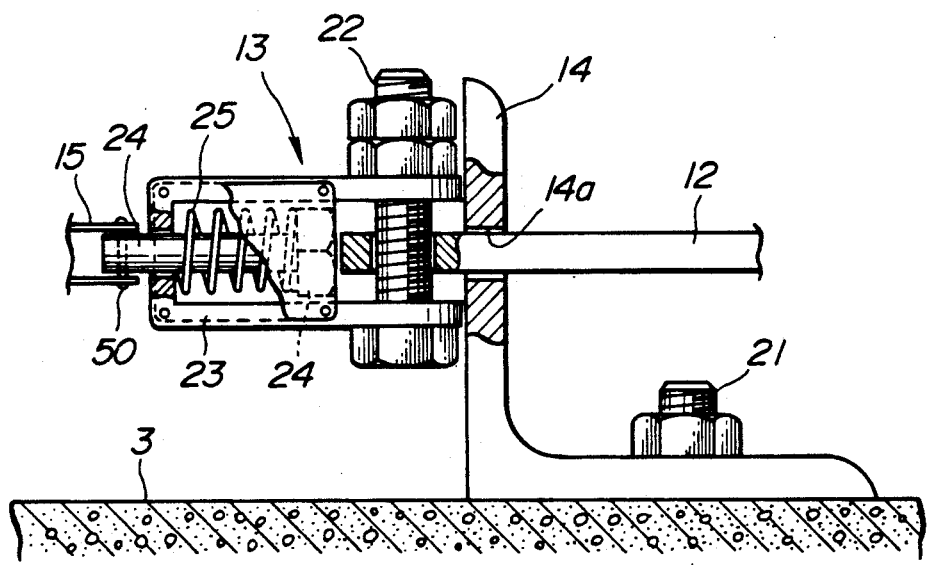

Each reaction base 14 is fixed at a position of the fixed floor 3 which is apart from the neutral position of the rod 2a by a distance slightly longer than the maximum movement distance (the maximum vibration) of the floor structure 2 when receiving the horizontal force by the earthquake or the like. In this embodiment, the damper rod 12 crosses the reaction base 14 at a right angle (FIG. 5), and this angle is determined by fixing the reaction base 14 to the fixed floor 3 with an anchor bolt 21 (FIG. 7). The plan shape of the reaction base 14 is a regular hexagon as shown in FIG. 5 and corresponds to the damper rods 12 which are arranged in radial directions of 120 degree angle with respect to the rod 2a. However, it may be possible to delete parts of the reaction base 14 which do not cross the damper rods 12, i.e., a non-continuous and non-hexagonal shape may be possible.

As shown in FIG. 7, the damper rod 12 passes through a slit 14a in the reaction base 14, and the stopper 13 is provided at the end portion of the damper rod 12. The stopper 13 touches the inner surface of the reaction base 14 and is limited from further movement. The slit 14a is formed along almost all the length of the reaction base 14, so that the damper rod 12 and the chain 15 can vibrate widely as shown by chain lines in FIG. 5 with respect to the horizontal vibration of the floor structure 2 (or the rod 2a).

Figure 6:
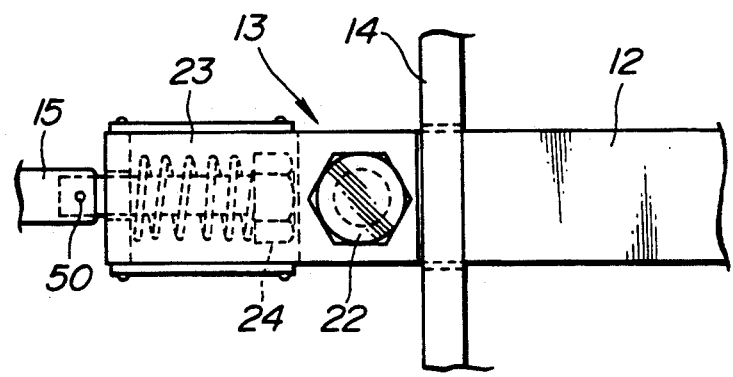
FIGS. 6 and 7 are plan and front views for explaining a relationship between a stopper and a reaction base.

The detail of the stopper 13 is shown in FIGS. 6 and 7. A main component is a bolt 22 perpendicularly passing through the end portion of the damper rod 12. A U-shaped holding frame 23 is attached at the bolt 22, and a contraction coil spring 25 is wound on to a coupling bolt 24 passing through a vertical wall of the holding frame 23 in the same direction as the damping rod 12. The chain 15 is coupled with the coupling bolt 24 by a pin 50. Thus, with the tension applied to the damper rod 12, the end of the holding frame 23 of the stopper 13 touches the reaction base 14 so as to be stopped. The contraction coil spring 25 is a means for preventing the chain 15 between the rod 2a, as the resistance input portion of the floor structure 2, and the reaction base 14 from being loosened and for facilitating operation without being loosened. In other words, the end of the stretched chain 15, connected to the coupling bolt 24 of the stopper 13 by the pin 50, is coupled with the rod 2a under a condition such that the contraction coil spring 25 is slightly loose. Thus, the chain is prevented from being loosened. If the rod 2a of the floor structure 2 moves slightly in the tension direction, this movement is directly transferred to the spring damper mechanism at the tension side. After the tension of the chain 15 is properly adjusted and coupled, the holding frame 23 is filled with a plug, such as mortar, to fix the coupling bolt 24 and the contraction coil spring 25.

Figure 8:
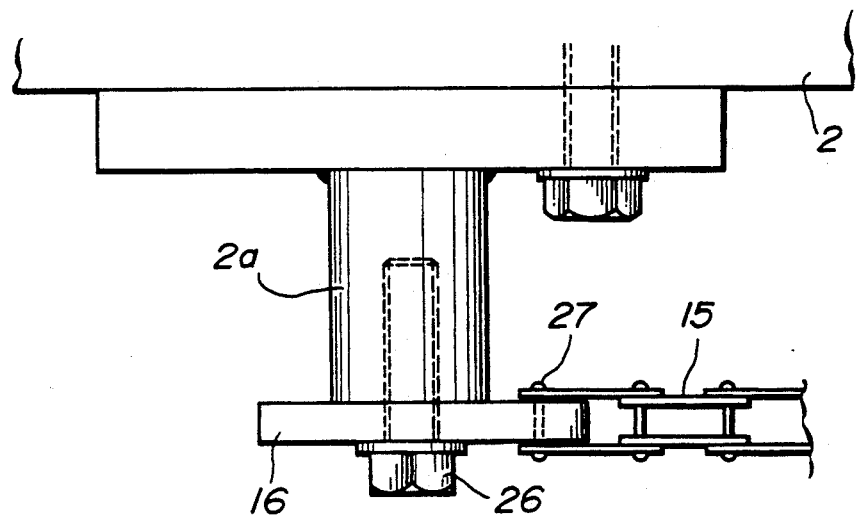
FIGS. 8 and 9 are elevation and bottom views for explaining a coupling condition of a flexible member and a rod of a floor structure.
Figure 9:
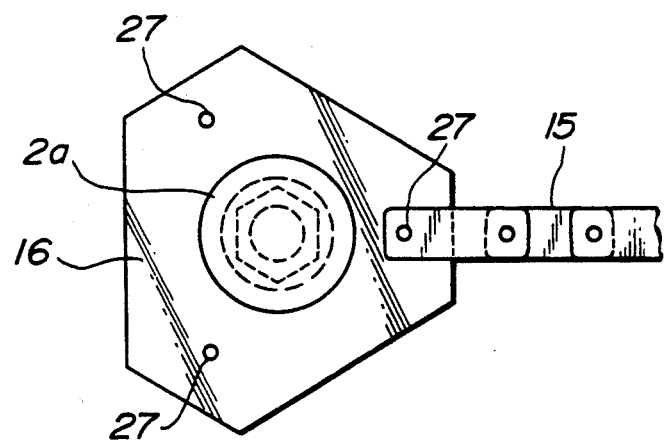

FIGS. 8 and 9 show the coupling of the chain 15 and the rod 2a. A coupling plate 51 is fixed at the lower end of the rod 2a by a bolt 26, and the end of each chain 15 is coupled with the coupling plate 51 in each direction by a pin 27.

FIGS. 10 and 11 show the construction of the spring damper mechanism 5. The cylinder 6 accommodates oil as the operation fluid, and the piston 10 is slidably provided in the cylinder 6. A piston rod 10a extends through oil seals 29 and 30 and is screwed to couple with a cone shaped spindle joint 31. For example, an external diameter of the cylinder 6 is $\phi 30$, and an effective stroke of the piston 10 is 250 mm. A damper rod 12 is screwed to couple with the spindle joint 31 in alignment with the piston rod 10a.

The piston 10 includes some orifices 9 which connect a front chamber 7 and a back chamber 8. As shown in FIG. 11 in detail, the reverse protection valves 34 are provided at the surface of the piston 10 at the back chamber side so that they are opened by the fluid flowing from the front chamber 7 to the back chamber 8 through the orifices 9 and 9' when the piston 10 moves forward. The size of each valve is such as to cover the opening of each the orifices 9' provided around the center of the piston 20. In other words, when the piston 10 moves to the right as seen in FIG. 11, i.e., when the spring damper mechanism 5 is contracted, the reverse protection valves 34 are opened by the fluid flow so that all the orifices 9' are opened. Thus, the cross sectional size of all the passages of the orifices 9 and 9' is the maximum, the flowing resistance for the fluid is remarkably reduced (the minimum throttle effect), and the piston 10 can move forward slowly with a low resistance. In other words, the contraction operation of the spring damper mechanism 5 is smooth and rapid, and there is no problem of the buckling of the piston rod 10a. Even if the recovery power of the tension spring 11 is not so strong, it does not affect the recovery operation of the floor structure 2 and is proper to increase the vibration period.

On the other hand, when the piston 10 moves rearward to the left of FIG. 11, i.e., when the spring damper mechanism 5 is expanded, many orifices 9' are covered with the reverse protection valves 34, and the other few orifices 9 apply a large resistance to the fluid flow (throttle effect) so as to produce the attenuation power.

In FIG. 10, the left end of the tension coil spring 11 is fixed by winding on to the outside of the cone shaped spindle joint 31, and the other portion of the coil spring 11 is loosely wound on to the outside of the cylinder 6. The right end of the spring 11 is fixed by winding on the outside of the cylinder head 35. For example, a line diameter of the tension coil spring 11 is $\phi 8$, a winding number is 58, a set load is 3 Kg, and the maximum load is 129 Kg. The screw shaft 32 and a ring bolt 35a of the cylinder head 35 are connected to each other by the pin as shown in FIGS. 4 and 5.

If the floor structure 2 having the movement inertia pulls the damper rod 12, the spindle joint 31 and the damper rod 12 move toward the left of FIG. 10 and the tension coil spring 11 is extended. Thus, since both the piston rod 10a and the piston 10 move toward the left, the attenuation power is applied to the floor structure 2. If the movement inertia of the floor structure 2 eases the tension power stored in the tension coil spring 11 is applied as the recovery power to the damper rod 12 through the spindle joint 31 so as to accomplish the recovery operation.

FIGS. 12 through 14 illustrate the spring damper mechanism 5 which is easy to receive the pretension for the trigger function and to adjust it. Especially, FIGS. 12 and 13 illustrate a condition before the pretension is applied. A spring receiver 40 is provided at the right end of the cylinder 6 independently, and the right end of the tension coil spring 11 is fixed to the spring receiver 40 by winding the former on to the latter. A long U-shaped positioning frame 41 is fixed to the right end of the cylinder 6 in alignment with the center axis of the cylinder 6. The spring receiver 40 is movable along both the legs of the positioning frame 41, and the former is fixed to the latter by a bolt 43 which is inserted into one of a plurality of bolt openings 42 provided at a predetermined pitch along the longitudinal direction of the positioning frame 41. A ring bolt 44 is mounted to the spring receiver 40 and is coupled with the screw shaft 32 through the coupling plate 45 by pin bolts 46 and 47.

After that, the bolt 43 is pulled out so as to make the relation between the spring receiver 40 and the positioning frame 41 free. By rotating a lock nut 33 on the screw shaft 32 in the forward direction, the tension coil spring 11 is extended so that the pretension may be applied. When the desired pretension is applied, the bolt 43 is inserted into the corresponding bolt opening 42 again to fix the relationship between the spring receiver 40 and the positioning frame 41. Thus, the value of the pretension becomes constant (FIG. 14).

The third embodiment of this invention will be discussed as follows:

FIGS. 15 and 16 show the floor vibration-damping apparatus in which the movable supporting portion 1 of the floor structure 2 and the damper working portion 4 are combined into a single construction. The floor structure 2 is supported by the movable supporting portion 1 using the balls 17 on which the floor structure 2 is free to move horizontally with the low resistance because of the rotation of the balls 17. The damper working portion 4 is provided between the floor structure 2 supported by the movable supporting portion 1 and the fixed floor 3. As shown in FIG. 15 illustrating the plan arrangement of the damper working portion 4, the three spring damper mechanisms 5 are arranged in three radial directions at angular separations of 120 degrees with respect to the movable supporting portion 1. The outer end of each spring damper mechanism 5 is coupled with the anchor bracket 20 on the fixed floor 3, and each damper rod 12 extends from the inner end of the spring damper mechanism 5 toward the movable supporting portion 1. The damper rod 12 is connected to the chain 15 whose end is coupled with the steel flat plate 18' as the floor structure side component of the mobable supporting portion 1. The steel flat plate 18' is the floor structure side component which corresponds to the resistance input portion (rod 2a) in the above discussed embodiment.

The reaction bases 14 are fixed to the fixed floor 3 by the anchor bolts 21, wherein the positions of the reaction bases are apart from the neutral position of the steel flat plate 18' of the movable supporting portion 1 by a distance slightly longer than the maximum movement distance (the maximum vibration) of the steel flat plate 18' when the floor structure 2 receives the horizontal input by the earthquake or the like. The reaction base 14 crosses the damper rod 12 at substantially a right angle. The plan shape of the reaction bases 14 is a distorted hexagon (FIG. 15) corresponding to the damper rods 12 arranged in the radial directions of 120 degrees with respect to the steel flat plate 18' of the movable supporting portion 1. However, the plan shape of the reaction bases may be another shape, i.e., the reaction bases not crossing the damper rods 12 may be deleted and each reaction base may be arranged independently.

Similarly to the above described embodiment, the damper rod 12 passes through the slit of the reaction base 14, and the stopper 13 is provided at the end of the rod 12. When the stopper 13 touches the inner surface of the reaction base 14, the movement is stopped. The slit is formed along almost all the length of the reaction base 14, so that the damper rod 12 and the chain 15 can vibrate widely as shown by chain lines in FIG. 15 with respect to all the direction vibration of the floor structure 2 and the movable supporting portion 1 supporting it.

The construction of the stopper 13 is the same as the second embodiment shown in FIGS. 6 and 7, wherein the tension of the chain 15 is properly adjusted and it is coupled with the steel flat plate 18'. The holding frame 23 is filled with a plug, such as mortar to fix completely the coupling bolt 24 and the contraction coil spring 25.

The construction of the spring damper mechanism 5 is the same as the second embodiment shown in FIGS. 10 and 11. In the recovery operation, the spring damper mechanism 5 is contracted and the reverse protection valves 34 open and thereby, remarkably reducing the flowing resistance of the operation fluid flowing through all the orifices 9 and 9'. Thus, the piston 10 moves smoothly with the low resistance, and the floor structure 2 recovers smoothly. Buckling does not occur in the piston rod 10a.

When the piston 10 moves backward, i.e., when the spring damper mechanism 5 expands by being pulled by the horizontal input to the floor structure 2, almost all of the orifices 9' are closed by the reverse protection valves 34 and the large throttle resistance occurs by the operation fluid flowing through the small number of orifices 9. Thus, the large attenuation force occurs.

Thus, when the floor structure 2 receiving the horizontal input pulls the damper rods 12, the spindle joint 31 and the damping rods 12 move simultaneously to expand the tension springs 11. In addition, the piston rods 10a and the pistons 10 move to the left, so that the attenuation effect may be accomplished.

As was described about the embodiments of the invention hereinbefore, the floor vibration-damping apparatus according to this invention employs the spring damper mechanism 5 which is constructed by combining the tension spring 11 and the piston cylinder type damper in the concentric condition, and thereby being easy to set or enstall it. A difference between the outside diameter of the piston 10 of the spring damper mechanism 5 and the inside diameter of the cylinder or the diameter (magnitude of the throttle resistance) of the orifice 9 in the piston 10 can be designed and manufactured accurately in the factory. Thus, it is convenient to carry and manage the floor vibration-damping apparatus and the quality thereof is very good. Since the completed spring damper mechanism 5 is carried and set in the building site, the field work is easy and certain. There is no possibility that the vibration-damping characteristics will change and the floor vibration-damping apparatus provides stable performance.

After the spring damping mechanism 5 is manufactured in the plant and is carried to the building site, it is set. This work is very simple and can be done by anybody. Fine adjustment is not necessary and it is not necessary to add the viscous fluid. Thus, the invention does not require the maintenance.

The spring damper mechanism 5 is assembled by using an inexpensive operation fluid. Since one group consists of three or four spring damper mechanisms, the total cost may be decreased and the construction is easy.

Figure 17:
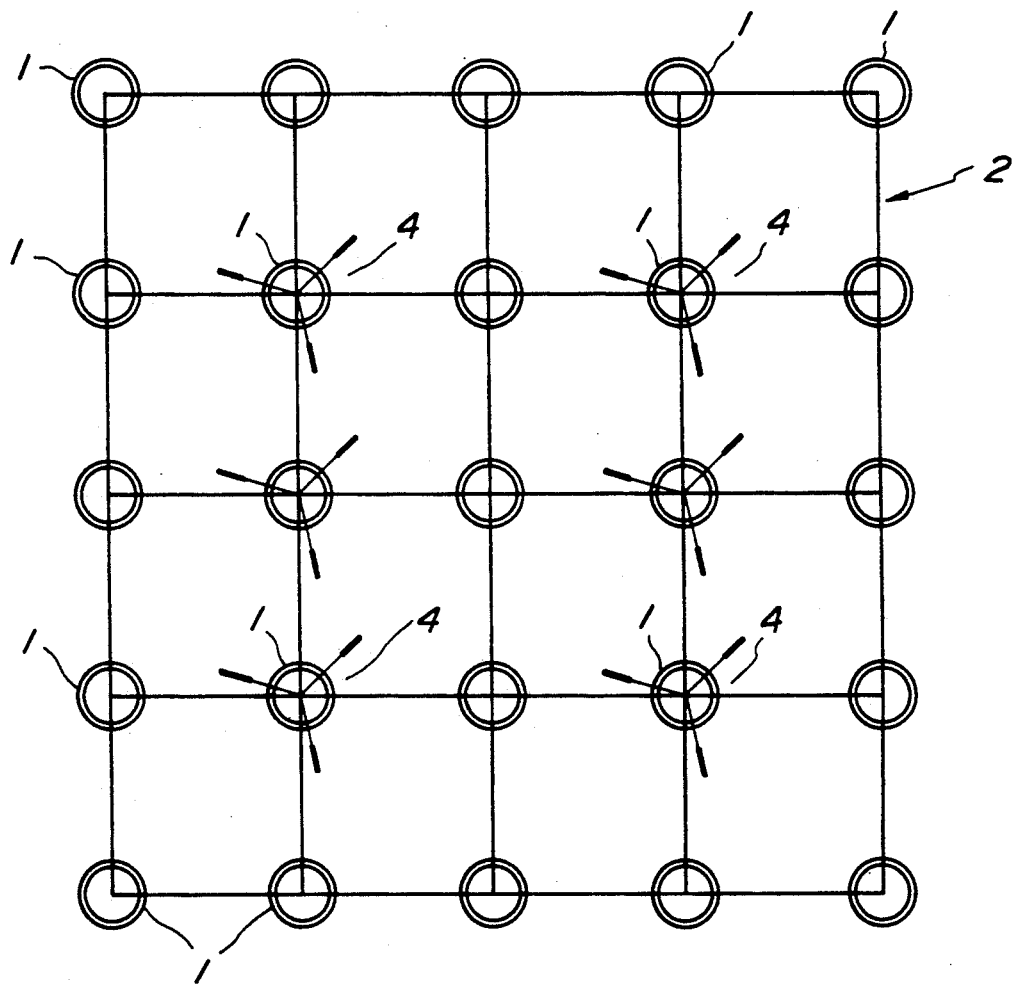
FIG. 17 is a plan view of an arrangement of movable supporting portions and damper working portions.
Figure 20:
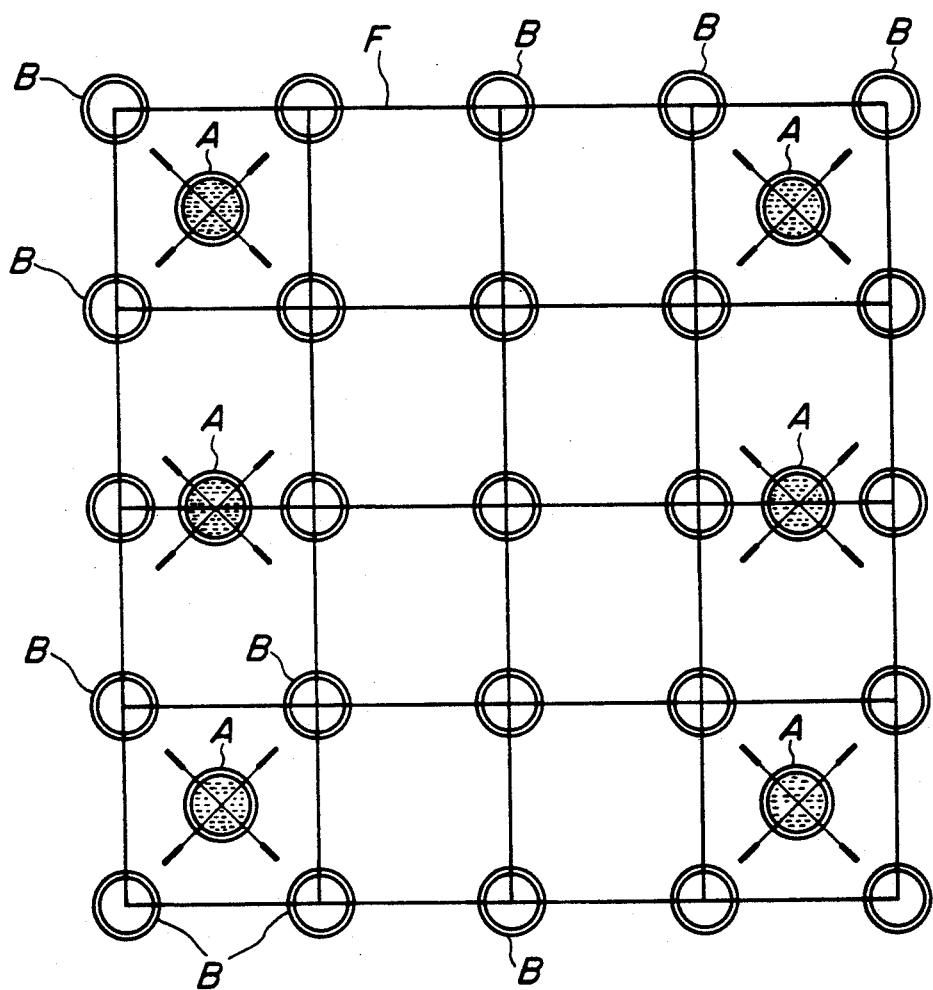
FIG. 20 is a plan view of an arrangement of conventional movable supporting portions and damper working portions.

The floor vibration-damping apparatus is constructed by combining the damping working portion 4 and the movable supporting portion 1 of the floor structure 2. It is not necessary to determine the setting space of the movable supporting portion 1 and the damper working portion 4 with respect to the surface of the floor structure 2 by considering their positions independently. First, the movable supporting portions 1 are arranged with respect to the floor structure 2 by considering the load balance as shown in FIG. 17. Second, it is determined with which of the movable supporting portions 1 are combined with the damper working portions 4. Since the movable supporting portion 1 is overlapped with the damper working portion 4, the space between the floor structure 2 and the fixed floor 3 is remarkably decreased (by comparing FIG. 17 with FIG. 20) and the floor space can be used effectively.

While the preferred embodiments of the present invention have been shown and described herein, it will be apparent to those skilled in the art that many changes and modifications may be made without departing from the invention in its broader aspects. Therefore, the scope of the present invention should be determined only by the following claims.

We claim:

1. In a floor vibration-damping apparatus having a movable supporting portion for supporting a floor structure which is free to move horizontally, and a damper working portion provided between said floor structure and a fixed floor, the improvement comprising:
    a) said damper working portion including a resistance input portion fixed to said movable floor structure and a plurality of spring damper mechanisms arranged radially with respect to said resistance input portion, said spring damper mechanisms having damper rods connected to said resistance input portion and cylinder portions coupled with said fixed-floor, said damper rods extending from said spring damper mechanisms to said resistance input portion of said movable floor structure;
    b) reaction bases fixed to said fixed floor at positions spaced from a neutral position of said resistance input portion by a predetermined movement distance; and
    c) a tension coil spring wound around each said cylinder portion, one end of said spring being fixed to one end of said cylinder and the other end of said spring being fixed to said damper rod so that said cylinder and said spring are concentric, a stopper connected to said damper rod between said reaction base and said resistance input portion, and a flexible member connected between said stopper and said resistance input portion.

2. A floor vibration-damping apparatus according to claim 1, wherein said spring damper mechanisms are arranged radially in three directions from said resistance input portion of said floor structure.

3. A floor vibration-damping apparatus according to claim 1, wherein said spring damper mechanisms are arranged radially in four orthogonal directions from said resistance input portion of said floor structure.

4. A floor vibration-damping apparatus according to claim 1, wherein said resistance input portion comprises a rod.

5. A floor vibration-damping apparatus according to claim 1, further comprising means for pre-loading said damper working portion to a trigger value which must be exceeded by forces tending to move said movable floor structure before said movable floor structure can move.

6. A floor vibration-damping apparatus according to claim 1, wherein said flexible member comprises a chain.

7. In a floor vibration-damping apparatus having a movable supporting portion for supporting a floor structure which is free to move horizontally, and a damper working portion provided between said floor structure and a fixed floor, the improvement comprising:
    a) said damper working portion including a plurality of spring damper mechanisms arranged radially with respect to said movable supporting portion, said spring damper mechanisms having damper rods coupled with said movable supporting portion and cylinder portions coupled with said fixed-floor;
    b) reaction bases fixed to said fixed floor at positions spaced from a neutral position of said movable supporting portion by a predetermined movement distance; and
    c) a tension coil spring wound around each said cylinder portion, one end of said spring being fixed to said cylinder and the other end of said spring being fixed to said damper rod so that said cylinder and said spring are concentric, a stopper connected to said damper rod between said reaction base and said movable supporting portion, and a flexible member connected between said stopper and said movable supporting portion.

8. A floor vibration-damping apparatus according to claim 1 or 7, wherein each said spring damper mechanism includes a piston having orifices coupling a front chamber and a back chamber in said cylinder, said cylinder accommodating viscous fluid.

9. A floor vibration-damping apparatus according to claim 8, wherein a reverse protection valve is provided at a back surface of said piston so that said valve opens an opening of at least one of said orifices by said viscous fluid flowing from said front chamber to said back chamber when said piston moves toward said front chamber.

10. A floor vibration-damping apparatus according to claim 7, wherein said spring damper mechanisms are arranged radially in three directions from said movable supporting portion of said floor structure.

11. A floor vibration-damping apparatus according to claim 7, wherein said spring damper mechanisms are arranged radially in four orthogonal directions from said movable supporting portion of said floor structure.

12. A floor vibration-damping apparatus according to claim 7, wherein said movable supporting portion comprises a flat steel plate.

13. A floor vibration-damping apparatus according to claim 7, further comprising means for pre-loading said damper working portion to a trigger value which must be exceeded by forces tending to move said movable floor structure before said movable floor structure can move.

14. A floor vibration-damping apparatus according to claim 7, wherein said flexible member comprises a chain.

15. A floor vibration-damping apparatus according to claim 13, wherein said pre-loading means comprises means for pre-loading said tension coil springs to said trigger value.

* * * * *